(12) United States Patent
Duan et al.

(10) Patent No.: US 11,428,055 B2
(45) Date of Patent: Aug. 30, 2022

(54) MULTICHANNEL COMPOSITE COILED TUBING

(71) Applicant: SHINDA (TANGSHAN) CREATIVE OIL & GAS EQUIPMENT CO., LTD., Tangshan (CN)

(72) Inventors: Jianliang Duan, Tangshan (CN); Jian Dong, Tangshan (CN); Shujun Zhang, Tangshan (CN); Xiang Liu, Tangshan (CN); Yueqing Lin, Tangshan (CN)

(73) Assignee: SHINDA (TANGSHAN) CREATIVE OIL & GAS EQUIPMENT CO., LTD, Tangshan Hebei (CN)

( * ) Notice: Subject to any disclaimer, the term of this patent is extended or adjusted under 35 U.S.C. 154(b) by 287 days.

(21) Appl. No.: 16/875,647

(22) Filed: May 15, 2020

(65) Prior Publication Data
US 2021/0198956 A1 Jul. 1, 2021

(30) Foreign Application Priority Data
Dec. 31, 2019 (CN) .......................... 201911418591.3

(51) Int. Cl.
*E21B 17/20* (2006.01)
*G06F 30/17* (2020.01)
*B32B 1/08* (2006.01)
*G06F 113/14* (2020.01)

(52) U.S. Cl.
CPC .............. *E21B 17/203* (2013.01); *B32B 1/08* (2013.01); *G06F 30/17* (2020.01); *B32B 2597/00* (2013.01); *G06F 2113/14* (2020.01)

(58) Field of Classification Search
CPC .............. B32B 2597/00; G06F 2113/14; E21B 17/203; F16L 11/22; F16L 11/085; F16L 9/18; F16L 9/19
USPC ........ 138/124, 111, 115, 116, 172, 174, 149; 174/47; 428/36.9
See application file for complete search history.

(56) References Cited

U.S. PATENT DOCUMENTS

| | | | | |
|---|---|---|---|---|
| 3,400,737 A | * | 9/1968 | Matthews | F16L 59/153 174/47 |
| 4,194,536 A | * | 3/1980 | Stine | F16L 59/153 392/480 |
| 4,399,319 A | * | 8/1983 | Zinn | F24S 80/30 174/95 |
| 4,653,541 A | * | 3/1987 | Oehlschlaeger | F17D 5/04 138/104 |

(Continued)

*Primary Examiner* — Patrick F Brinson
(74) *Attorney, Agent, or Firm* — Tutunjian & Bitetto, P.C.

(57) ABSTRACT

The present invention discloses a multichannel composite coiled tubing (CCT). The multichannel composite coiled tubing includes three inner pipes and an insulator, where the insulator is provided therein with a plurality of the inner pipes; the insulator is nested inside a sheath; a protective layer is welded outside the sheath; a compressive layer is welded outside the protective layer; a plurality of armored tubes are bonded to the outside of the compressive layer; a fiber layer is bonded to the outside of the armored tubes. In the present invention, the operation and test procedures are simple, the pressure is easy to measure, and a water injection additive can be easily selected to match different reservoirs. In addition, the coiled tubing is insulated, satisfying pressure transmission and logging through two cables. The compressive layer and the armored tube are convenient for extending the life of the tubing.

20 Claims, 2 Drawing Sheets

(56) References Cited

U.S. PATENT DOCUMENTS

| | | | | |
|---|---|---|---|---|
| 4,963,420 A | * | 10/1990 | Jarrin | D07B 1/20 |
| | | | | 174/101.5 |
| 6,901,968 B2 | * | 6/2005 | Thomson | F16L 11/088 |
| | | | | 138/146 |
| 7,631,668 B2 | * | 12/2009 | Rantalainen | B29C 48/11 |
| | | | | 138/121 |
| 11,220,892 B2 | * | 1/2022 | Duan | F16L 11/22 |

* cited by examiner

MULTICHANNEL COMPOSITE COILED TUBING

CROSS-REFERENCE TO RELATED APPLICATIONS

This application is a non-provisional application that claims priority to Chinese Application Serial No. 201911418591.3 filed on Dec. 31, 2019, the disclosure of which is incorporated by reference herein in its entirety.

TECHNICAL FIELD

The present invention relates to the technical field of tubing, and in particular, to a multichannel composite coiled tubing (CCT).

BACKGROUND

Coiled tubing is widely used in workover, drilling, completion, logging and other operations in oil and gas fields, which runs through the whole process of oil and gas production and is known as a "universal operation machine". However, coiled tubing has only a single channel, and thus has limitations when operating in oil and gas fields, especially in layered water injection. Because of the complex geological conditions, most of the oil fields in China have strong reservoir heterogeneity and great differences in reservoir porosity and permeability. If unified water injection is adopted directly, it will cause too much water absorbed in the high-permeability layer and insufficient or even no water absorbed in the middle and low-permeability layers. Consequently, the high-permeability layer will have poor oil displacement and the injected water may inrush, leading to premature flooding of the oil well. As for the medium and low-permeability layers, they will have a lower recovery factor and become a remaining oil-enriched area. Therefore, layered water injection is generally adopted for multi-layer reservoirs at home and abroad. The current layered water injection method usually uses tubing as the main channel for water injection. An eccentric water injector is suspended at the bottom of the tubing, and the eccentric water injector is connected to the ground control system through a cable. The water injection and the test of the formation pressure are completed through the cables. The tubing needs to be connected one by one during the running process, and the cable is bound to the outside of the tubing. The operation and test procedures are complicated, the pressure is difficult to measure, and water injection additives cannot be selected to match different reservoirs.

SUMMARY

The present invention provides a multichannel CCT. The present invention effectively solves the problems in the prior art that the operation and test procedures are complicated, the pressure is difficult to measure and water injection additives cannot be selected to match different reservoirs.

To achieve the above purpose, the present invention provides the following technical solutions: A multichannel composite coiled tubing (CCT) includes three inner pipes and an insulator, where the insulator is provided therein with a plurality of the inner pipes; the insulator is nested inside a sheath; a protective layer is welded outside the sheath; a compressive layer is welded outside the protective layer; a plurality of armored tubes are bonded to the outside of the compressive layer; a fiber layer is bonded to the outside of the armored tubes; a filler is provided among the armored tubes between the fiber layer and the compressive layer; an anti-corrosive layer is bonded to the outside of the fiber layer.

According to the above technical solution, there are 15-35 armored tubes arranged in a ring shape.

According to the above technical solution, a conduit is embedded in the side of the inner pipe inside the insulator, and a shield layer is adhered to the outside of the conduit.

According to the above technical solution, an armored layer sleeves the outside of the inner pipes.

According to the above technical solution, the shield layer is a shield net and the conduit is a copper wire.

A method for preparing a multichannel CCT includes the following steps:

S1. analyzing a service condition and a function of the three-channel-combined coiled tubing;

S2. performing material selection, mechanical property design and structure selection of the tubing;

S3. performing fine wrapping, heat pipe internal protection and thermal treatment molding;

S4. inspecting and testing after production; and

S5. applying after inspection and testing are qualified, and recording the data.

According to the above technical solution, in step S2, the mechanical property design covers tensile strength, crushing strength and internal pressure strength of the tubing;

the material selection includes: designing a structural parameter of the multichannel tubing for layered water injection according to a general flow requirement of coiled tubing operation; determining an outer diameter of the multichannel tubing, and a geometric size, a tensile capacity and a pressure bearing capacity of each channel; selecting an optimal multichannel arrangement scheme to organically combine the channels of the coiled tubing to avoid the problems of low space utilization, difficult processing, large gap, easy loosening and sliding, where through the material selection and structural design, material and production costs are reduced;

structure selection: during use, the coiled tubing is in a plastic deformation state, and repeated lifting and descending will cause relative displacement of the channel and damage the product structure; the production technology of multichannel tubing for layered water injection is actively explored according to the existing production technology of coiled tubing and cables, so as to achieve manufacturing feasibility goals such as functional design, structural design and continuous design.

According to the above technical solution, in step S3, the inner pipe and the conduit are placed in a mold; then a raw material of the insulator is cast into the mold, and an outer layer is sleeved and cast; finally the molding is detected.

According to the above technical solution, in step S3, the inner pipe and the armored layer are fixed; then a raw material of the insulator is cast into a mold, and an outer layer is sleeved and cast; finally the molding is detected.

According to the above technical solution, the data in step S5 refers to cost reduced.

Compared with the prior art, the present invention has the beneficial effects of scientific and reasonable structure and safe and convenient use.

1. The operation and test procedures are simple, the pressure is easy to measure, and a water injection additive can be easily selected to match different reservoirs. In addition, the coiled tubing is insulated, satisfying pressure transmission and logging through two cables.

2. A compressive layer and an armored tube are convenient for extending the life of the tubing. The armored tube and a fiber layer improve the toughness and softness of a pipe gallery, which can adapt to different terrains. An anti-corrosive layer improves the service life of the tubing.

3. The service conditions and functions of the three-channel-combined coiled tubing are analyzed to realize normal data acquisition. Material selection, mechanical property design and structure selection are performed to realize reasonable material use. The optimal multichannel arrangement scheme is selected to organically combine the channels of the coiled tubing to avoid the problems of low space utilization, difficult processing, large gap, easy loosening and sliding. Through the material selection and structural design, the material and production costs are reduced.

4. The costs are reduced while normal use is ensured.

BRIEF DESCRIPTION OF DRAWINGS

The accompanying drawings are provided for further understanding of the present invention, and constitute a part of the specification. The exemplary examples and illustrations thereof of the present invention are intended to explain the present invention, but do not constitute limitations to the present invention.

In the accompanying drawings.

Figure 1:
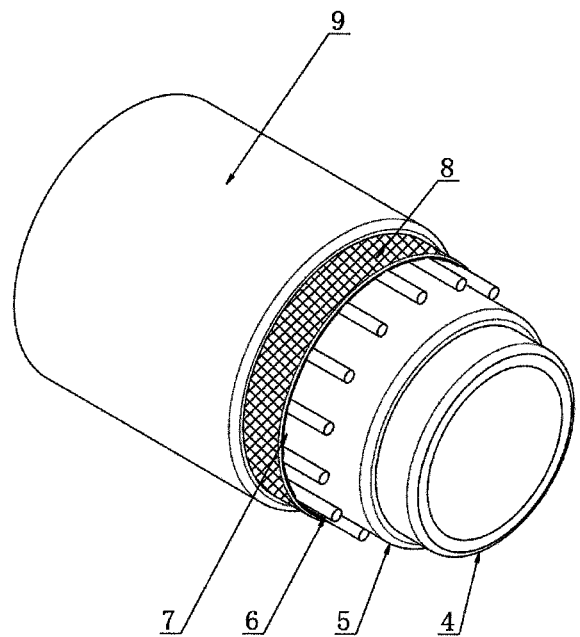
FIG. 1 is a schematic structural diagram of the present invention.

Reference Numerals: 1. inner pipe, 2. insulator, 3. sheath, 4. protective layer, 5. compressive layer, 6. armored tube, 7. filler, 8. fiber layer, 9. anti-corrosive layer, 10. armored layer, 11. conduit, and 12. shield layer.

DETAILED DESCRIPTION

The preferred examples of the present invention are described below with reference to the accompanying drawings. It should be understood that the preferred examples described herein are only used to illustrate and explain the present invention, bur are not intended to limit the present invention.

Example 1

As shown in FIG. 1, the present invention provides a technical solution, a multichannel CCT. The coiled tubing includes three inner pipes 1 and an insulator 2. The insulator 2 is provided therein with a plurality of the inner pipes 1, and the inner pipes 1 are convenient and quick for the transportation of an oil pipeline. The insulator 2 can also function as a heat insulator, and the insulator 2 is nested inside a sheath 3. A protective layer 4 is welded outside the sheath 3. A compressive layer 5 is welded outside the protective layer 4 to improve the toughness of the tubing. A plurality of armored tubes 6 are bonded to the outside of the compressive layer 5. There are 15 armored tubes 6 arranged in a ring shape for use. A fiber layer 8 is bonded to the outside of the armored tubes 6. A filler 7 is provided among the armored tubes 6 between the fiber layer 8 and the compressive layer 5. The compressive layer 5 and the armored tube 6 are convenient for extending the life of the tubing. The armored tube 6 and the fiber layer 8 improve the toughness and softness of a pipe gallery, which can adapt to different terrains. An anti-corrosive layer 9 is bonded to the outside of the fiber layer 8, which is convenient for extending the service life of the tubing.

Example 2

Figure 2:
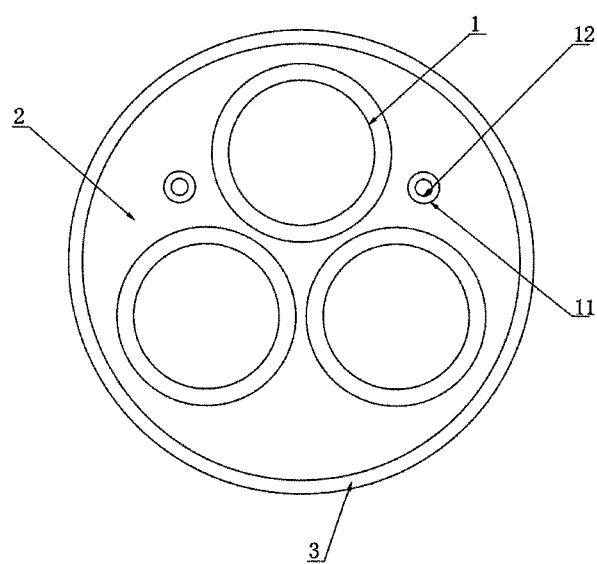
FIG. 2 is an installation diagram of a conduit of the present invention.

As shown in FIG. 1 and FIG. 2, the present invention provides a technical solution, a multichannel CCT. The coiled tubing includes three inner pipes 1 and an insulator 2. The insulator 2 is provided therein with a plurality of the inner pipes 1, and the inner pipes 1 are convenient and quick for the transportation of an oil pipeline. The insulator 2 can also function as a heat insulator, and the insulator 2 is nested inside a sheath 3. A protective layer 4 is welded outside the sheath 3. A compressive layer 5 is welded outside the protective layer 4 to improve the toughness of the tubing. A plurality of armored tubes 6 are bonded to the outside of the compressive layer 5. There are 20 armored tubes 6 arranged in a ring shape for use. A fiber layer 8 is bonded to the outside of the armored tubes 6. A filler 7 is provided among the armored tubes 6 between the fiber layer 8 and the compressive layer 5. The compressive layer 5 and the armored tube 6 are convenient for extending the life of the tubing. The armored tube 6 and the fiber layer 8 improve the toughness and softness of a pipe gallery, which can adapt to different terrains. An anti-corrosive layer 9 is bonded to the outside of the fiber layer 8, which is convenient for extending the service life of the tubing. A conduit 11 is embedded in the side of the inner pipe 1 inside the insulator 2, and a shield layer 12 is adhered to the outside of the conduit 11. In order to improve the signal transmission quality, the shield layer 12 is a shield net and the conduit 11 is a copper wire.

Example 3

Figure 3:
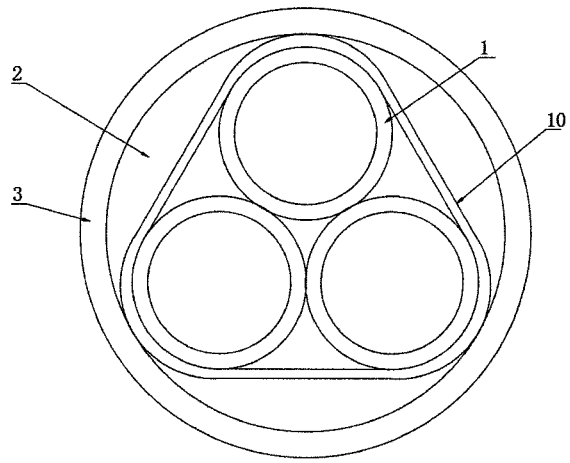
FIG. 3 is an installation diagram of an armored layer of the present invention.

As shown in FIG. 1 and FIG. 3, the present invention provides a technical solution, a multichannel CCT. The coiled tubing includes three inner pipes 1 and an insulator 2. The insulator 2 is provided therein with a plurality of the inner pipes 1, and the inner pipes 1 are convenient and quick for the transportation of an oil pipeline. The insulator 2 can also function as a heat insulator, and the insulator 2 is nested inside a sheath 3. A protective layer 4 is welded outside the sheath 3. A compressive layer 5 is welded outside the protective layer 4 to improve the toughness of the tubing. A plurality of armored tubes 6 are bonded to the outside of the compressive layer 5. There are 20 armored tubes 6 arranged in a ring shape for use. A fiber layer 8 is bonded to the outside of the armored tubes 6. A filler 7 is provided among the armored tubes 6 between the fiber layer 8 and the compressive layer 5. The compressive layer 5 and the armored tube 6 are convenient for extending the life of the tubing. The armored tube 6 and the fiber layer 8 improve the toughness and softness of a pipe gallery, which can adapt to different terrains. An anti-corrosive layer 9 is bonded to the outside of the fiber layer 8. An armored layer 10 sleeves the three inner pipes 1 to prevent deformation of the inner pipes 1.

Example 4

Figure 4:
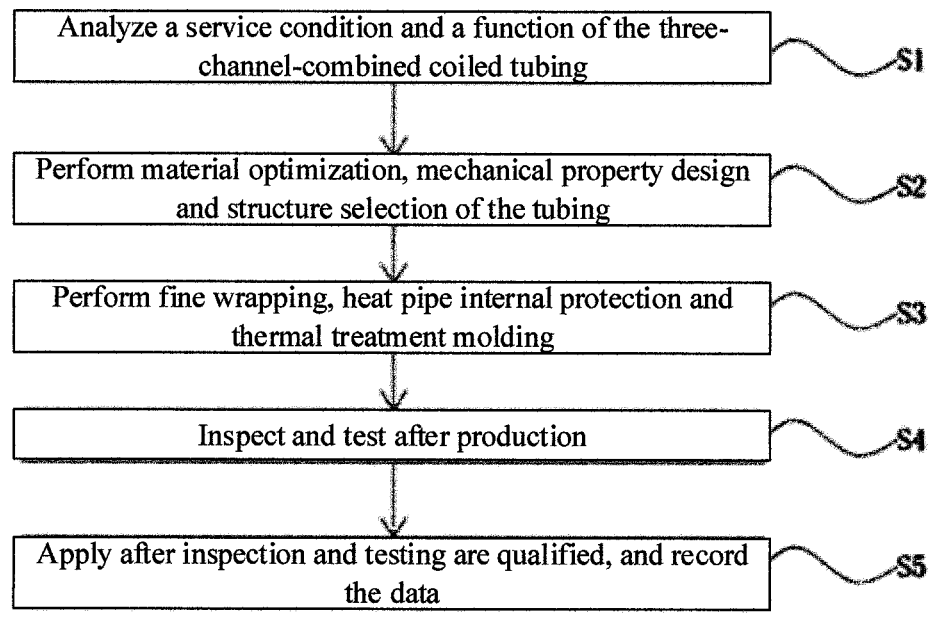
FIG. 4 is a flowchart of a preparation method of the present invention.

As shown in FIG. 4, the present invention provides a technical solution, a method for preparing the multichannel CCT, including the following steps:

S1. Analyze a service condition and a function of the three-channel-combined coiled tubing.

S2. Perform material selection, mechanical property design and structure selection of the tubing.

S3. Perform fine wrapping, heat pipe internal protection and thermal treatment molding;

S4. Inspect and test after production.

S5. Apply after inspection and testing are qualified, and record the data.

According to the above technical solution, in step S2, the mechanical property design covers tensile strength, crushing strength and internal pressure strength of the tubing.

According to a general flow requirement of coiled tubing operation, a structural parameter of the multichannel tubing for layered water injection is designed. An outer diameter of the multichannel tubing, and a geometric size, a tensile capacity and a pressure bearing capacity of each channel are determined. An optimal multichannel arrangement scheme is selected to organically combine the channels of the coiled tubing to avoid the problems of low space utilization, difficult processing, large gap, easy loosening and sliding. Through the material selection and structural design, the material and production costs are reduced.

During use, the coiled tubing is in a plastic deformation state, and repeated lifting and descending will cause relative displacement of the channel and damage the product structure. The production technology of multichannel tubing for layered water injection is actively explored according to the existing production technology of coiled tubing and cables. The manufacturing feasibility goals such as functional design, structural design and continuous design are achieved.

According to the above technical solution, in step S3, the inner pipe and the conduit are placed in a mold; then a raw material of the insulator is cast into the mold, and an outer layer is sleeved and cast; finally, the molding is detected.

According to the above technical solution, in step S3, the inner pipe and the armored layer are fixed; then a raw material of the insulator is cast into a mold, and an outer layer is sleeved and cast; finally, the molding is detected.

According to the above technical solution, the data in step S5 refers to cost reduced.

The present invention has the following economic and social benefits.

In this application, the operation and test procedures are simple, the pressure is easy to measure, and a water injection additive can be easily selected to match different reservoirs. This coiled tubing is insulated, satisfying pressure transmission and logging through two cables. The service conditions and functions of the three-channel-combined coiled tubing are analyzed to realize normal data acquisition. The material selection, mechanical property design and structure selection realize reasonable material use. The optimal multichannel arrangement scheme is selected to organically combine the channels of the coiled tubing to avoid the problems of low space utilization, difficult processing, large gap, easy loosening and sliding. Through the material selection and structural design, the material and production costs are reduced while normal use is ensured.

It should be noted that the above are only preferred examples of the present invention and are not intended to limit the present invention. Although the present invention is described in detail with reference to the foregoing examples, it will be apparent to those skilled in the art that modifications can be made to the technical solutions described in the foregoing examples, or some of the technical features can be equivalently replaced. Any modifications, equivalent substitutions, improvements, etc. made within the spirit and scope of the present invention should be included within the protection scope of the present invention.

What is claimed is:

1. A multichannel composite coiled tubing (CCT), comprising three inner pipes (1) and an insulator (2), wherein the insulator (2) is provided therein with a plurality of the inner pipes (1); the insulator (2) is nested inside a sheath (3); a protective layer (4) is welded outside the sheath (3); a compressive layer (5) is welded outside the protective layer (4); a plurality of armored tubes (6) are bonded to the outside of the compressive layer (5); a fiber layer (8) is bonded to the outside of the armored tubes (6); a filler (7) is provided among the armored tubes (6) between the fiber layer (8) and the compressive layer (5); an anti-corrosive layer (9) is bonded to the outside of the fiber layer (8).

2. The multichannel CCT according to claim 1, wherein there are 15-35 armored tubes (6) arranged in a ring shape.

3. The multichannel CCT according to claim 1, wherein a conduit (11) is embedded in the side of the inner pipe (1) inside the insulator (2), and a shield layer (12) is adhered to the outside of the conduit (11).

4. The multichannel CCT according to claim 1, wherein an armored layer (10) sleeves the outside of the inner pipes (1).

| Economic Benefits | Industry | Annual Output | Unit Price | Overall Industrial Output | Sales Volume | Profit/Tax | Foreign Exchange Earning (Unit: 10,000 USD) |
|---|---|---|---|---|---|---|---|
| | | 30 km | 400,000 yuan | 12,000,000 yuan | 12,000,000 yuan | 1,500,000 yuan | 70 |
| | Agriculture | Area of Test (Promotion) (mu) | Overall Agricultural Output | Per Capita Output | Yield Per Mu (Kg) | Agricultural Net Income | Per Capita Net Income |
| Social Benefits (including environmental protection, energy conservation and medical care, etc.) | The multichannel tubing effectively solves the problem of layered water injection in oil and gas fields, and increases oil production by 50 t per day. | | | | | | |

5. The multichannel CCT according to claim 1, wherein the shield layer (12) is a shield net and the conduit (11) is a copper wire.

6. A method for preparing the multichannel CCT according to claim 1, comprising the following steps:
- S1. analyzing a service condition and a function of the three-channel-combined coiled tubing;
- S2. performing material selection, mechanical property design and structure selection of the tubing;
- S3. performing fine wrapping, heat pipe internal protection and thermal treatment molding;
- S4. inspecting and testing after production; and
- S5. applying after inspection and testing are qualified, and recording the data.

7. A method for preparing the multichannel CCT according to claim 2, comprising the following steps:
- S1. analyzing a service condition and a function of the three-channel-combined coiled tubing;
- S2. performing material selection, mechanical property design and structure selection of the tubing;
- S3. performing fine wrapping, heat pipe internal protection and thermal treatment molding;
- S4. inspecting and testing after production; and
- S5. applying after inspection and testing are qualified, and recording the data.

8. A method for preparing the multichannel CCT according to claim 3, comprising the following steps:
- S1. analyzing a service condition and a function of the three-channel-combined coiled tubing;
- S2. performing material selection, mechanical property design and structure selection of the tubing;
- S3. performing fine wrapping, heat pipe internal protection and thermal treatment molding;
- S4. inspecting and testing after production; and
- S5. applying after inspection and testing are qualified, and recording the data.

9. A method for preparing the multichannel CCT according to claim 4, comprising the following steps:
- S1. analyzing a service condition and a function of the three-channel-combined coiled tubing;
- S2. performing material selection, mechanical property design and structure selection of the tubing;
- S3. performing fine wrapping, heat pipe internal protection and thermal treatment molding;
- S4. inspecting and testing after production; and
- S5. applying after inspection and testing are qualified, and recording the data.

10. A method for preparing the multichannel CCT according to claim 5, comprising the following steps:
- S1. analyzing a service condition and a function of the three-channel-combined coiled tubing;
- S2. performing material selection, mechanical property design and structure selection of the tubing;
- S3. performing fine wrapping, heat pipe internal protection and thermal treatment molding;
- S4. inspecting and testing after production; and
- S5. applying after inspection and testing are qualified, and recording the data.

11. The method for preparing the multichannel CCT according to claim 6, wherein in step S2, the mechanical property design covers tensile strength, crushing strength and internal pressure strength of the tubing;
- the material selection comprises: designing a structural parameter of the multichannel tubing for layered water injection according to a general flow requirement of coiled tubing operation; determining an outer diameter of the multichannel tubing, and a geometric size, a tensile capacity and a pressure bearing capacity of each channel; selecting an optimal multichannel arrangement scheme to organically combine the channels of the coiled tubing to avoid the problems of low space utilization, difficult processing, large gap, easy loosening and sliding, wherein through the material selection and structural design, material and production costs are reduced;
- structure selection: during use, the coiled tubing is in a plastic deformation state, and repeated lifting and descending will cause relative displacement of the channel and damage the product structure; the production technology of multichannel tubing for layered water injection is actively explored according to the existing production technology of coiled tubing and cables, so as to achieve manufacturing feasibility goals such as functional design, structural design and continuous design.

12. The method for preparing the multichannel CCT according to claim 7, wherein in step S2, the mechanical property design covers tensile strength, crushing strength and internal pressure strength of the tubing;
- the material selection comprises: designing a structural parameter of the multichannel tubing for layered water injection according to a general flow requirement of coiled tubing operation; determining an outer diameter of the multichannel tubing, and a geometric size, a tensile capacity and a pressure bearing capacity of each channel; selecting an optimal multichannel arrangement scheme to organically combine the channels of the coiled tubing to avoid the problems of low space utilization, difficult processing, large gap, easy loosening and sliding, wherein through the material selection and structural design, material and production costs are reduced;
- structure selection: during use, the coiled tubing is in a plastic deformation state, and repeated lifting and descending will cause relative displacement of the channel and damage the product structure; the production technology of multichannel tubing for layered water injection is actively explored according to the existing production technology of coiled tubing and cables, so as to achieve manufacturing feasibility goals such as functional design, structural design and continuous design.

13. The method for preparing the multichannel CCT according to claim 8, wherein in step S2, the mechanical property design covers tensile strength, crushing strength and internal pressure strength of the tubing;
- the material selection comprises: designing a structural parameter of the multichannel tubing for layered water injection according to a general flow requirement of coiled tubing operation; determining an outer diameter of the multichannel tubing, and a geometric size, a tensile capacity and a pressure bearing capacity of each channel; selecting an optimal multichannel arrangement scheme to organically combine the channels of the coiled tubing to avoid the problems of low space utilization, difficult processing, large gap, easy loosening and sliding, wherein through the material selection and structural design, material and production costs are reduced;
- structure selection: during use, the coiled tubing is in a plastic deformation state, and repeated lifting and descending will cause relative displacement of the channel and damage the product structure; the production technology of multichannel tubing for layered water injection is actively explored according to the existing production technology of coiled tubing and cables, so as to achieve manufacturing feasibility goals such as functional design, structural design and continuous design.

14. The method for preparing the multichannel CCT according to claim 9, wherein in step S2, the mechanical property design covers tensile strength, crushing strength and internal pressure strength of the tubing;

the material selection comprises: designing a structural parameter of the multichannel tubing for layered water injection according to a general flow requirement of coiled tubing operation; determining an outer diameter of the multichannel tubing, and a geometric size, a tensile capacity and a pressure bearing capacity of each channel; selecting an optimal multichannel arrangement scheme to organically combine the channels of the coiled tubing to avoid the problems of low space utilization, difficult processing, large gap, easy loosening and sliding, wherein through the material selection and structural design, material and production costs are reduced;

structure selection: during use, the coiled tubing is in a plastic deformation state, and repeated lifting and descending will cause relative displacement of the channel and damage the product structure; the production technology of multichannel tubing for layered water injection is actively explored according to the existing production technology of coiled tubing and cables, so as to achieve manufacturing feasibility goals such as functional design, structural design and continuous design.

15. The method for preparing the multichannel CCT according to claim 10, wherein in step S2, the mechanical property design covers tensile strength, crushing strength and internal pressure strength of the tubing;

the material selection comprises: designing a structural parameter of the multichannel tubing for layered water injection according to a general flow requirement of coiled tubing operation; determining an outer diameter of the multichannel tubing, and a geometric size, a tensile capacity and a pressure bearing capacity of each channel; selecting an optimal multichannel arrangement scheme to organically combine the channels of the coiled tubing to avoid the problems of low space utilization, difficult processing, large gap, easy loosening and sliding, wherein through the material selection and structural design, material and production costs are reduced;

structure selection: during use, the coiled tubing is in a plastic deformation state, and repeated lifting and descending will cause relative displacement of the channel and damage the product structure; the production technology of multichannel tubing for layered water injection is actively explored according to the existing production technology of coiled tubing and cables, so as to achieve manufacturing feasibility goals such as functional design, structural design and continuous design.

16. The method for preparing the multichannel CCT according to claim 6, wherein in step S3, the inner pipe and the conduit are placed in a mold; then a raw material of the insulator is cast into the mold, and an outer layer is sleeved and cast; finally, the molding is detected.

17. The method for preparing the multichannel CCT according to claim 7, wherein in step S3, the inner pipe and the conduit are placed in a mold; then a raw material of the insulator is cast into the mold, and an outer layer is sleeved and cast; finally, the molding is detected.

18. The method for preparing the multichannel CCT according to claim 8, wherein in step S3, the inner pipe and the conduit are placed in a mold; then a raw material of the insulator is cast into the mold, and an outer layer is sleeved and cast; finally, the molding is detected.

19. The method for preparing the multichannel CCT according to claim 6, wherein in step S3, the inner pipe and the armored layer are fixed; then a raw material of the insulator is cast into a mold, and an outer layer is sleeved and cast; finally, the molding is detected.

20. The multichannel CCT according to claim 6, wherein the data in step S5 refers to cost reduced.

* * * * *